Oct. 15, 1963    J. KARPOVICH ET AL    3,106,983
FOAMED PLASTIC SOUND ABSORBING MATERIAL

Filed Dec. 6, 1960    2 Sheets-Sheet 1

INVENTORS.
John Karpovich
Robert J. Dufresne
BY Robert B. Ingraham
AGENT

3,106,983
FOAMED PLASTIC SOUND ABSORBING MATERIAL

John Karpovich, Midland, and Robert J. Dufresne, Bay City, Mich., assignors to The Dow Chemical Company, Midland, Mich., a corporation of Delaware
Filed Dec. 6, 1960, Ser. No. 74,193
8 Claims. (Cl. 181—33)

This invention relates to a method of improving sound absorption qualities of foam plastic sheets, and foam plastic sheets having improved sound absorbing characteristics.

A wide variety of acoustical materials are known and used in building and other construction. However, all of these materials are generally lacking in a good combination of properties, for example, most sound absorbing sheets either have a relatively high bulk density such as concrete, or both a low bulk density and relatively poor structural properties, such as glass filaments and fibrous board materials, such as are prepared from woodpulp and the like.

Thermal insulation, moisture resistance, sound absorbing properties and low bulk density are four characteristics that are generally not found together in structural materials. Closed cell foamed plastic boards or sheets generally have excellent thermal insulative characteristics, low bulk density, and resistance to moisture. However, such closed cell foamed plastic panels have relatively poor sound absorbing properties.

It would be advantageous if there were a method available for the fabrication of a closed cell foamed plastic sheet or board having improved sound absorbing characteristics.

It would be further advantageous if a method were available which would permit fabrication of such board at a minimum expense.

It would be particularly beneficial if such a sound absorbing board were available that had at least one surface suitable for use as an interior wall face.

It would be most beneficial if such an insulating sound absorbing sheet or board would not absorb moisture.

These benefits and other advantages may be obtained in accordance with this invention by providing a closed cell foamed plastic sheet as a sound absorbing member having a plurality of slits formed therein, each penetrating but one face thereof, each of said slits providing at least a pair of internal contiguous surfaces abutting each other in frictional engagement.

The term "internal surface" as used herein refers to the plane or other surface of scission beneath the external surface of the sound absorbing member, and it does not refer to the total exposed surface of the foamed plastic body in which one would include the total surface area presented by each severed cell.

Further features of the invention will be more apparent in the following description and specification of the drawings wherein.

Figure 4:
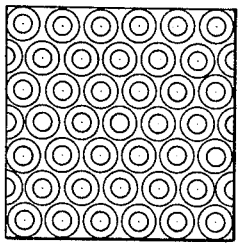
Figure 5:
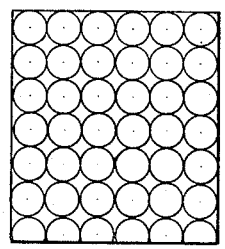
Figure 6:
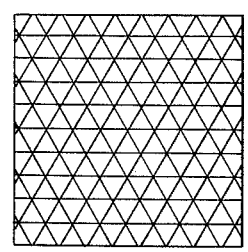

FIGURES 4, 5, and 6 show some of the various geometrical arrangements of slits which may be employed with boards or sheets according to the invention.

Figure 7:
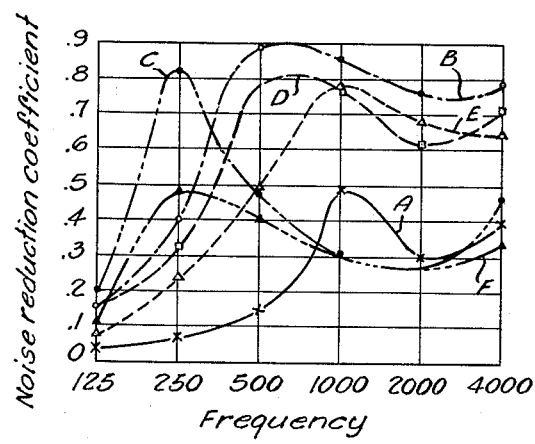

FIGURE 7 is a graphical representation of the change in the noise reduction coefficient at various frequencies for several slit patterns.

Figure 8:
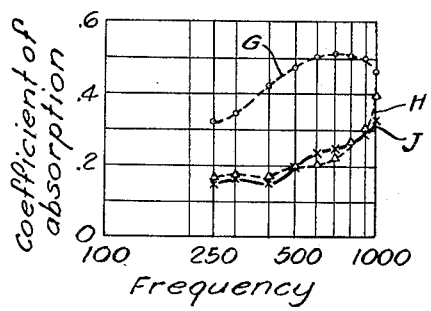
Figure 9:
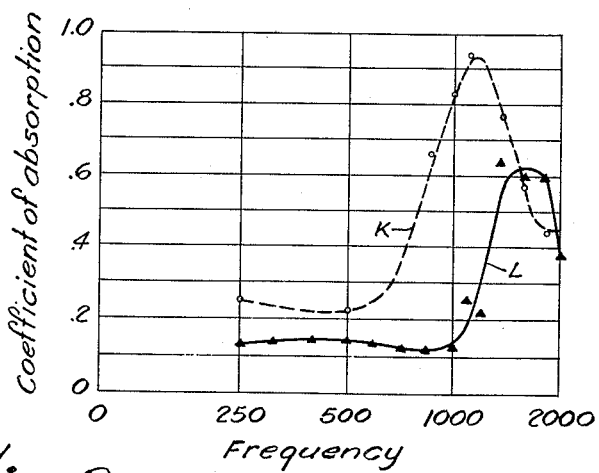

FIGURES 8 and 9 graphically depict the coefficient of absorption at various frequencies of foam plastic sheets slit into a concentric cylindrical pattern and a sheet having annular grooves formed therein.

Figure 1:
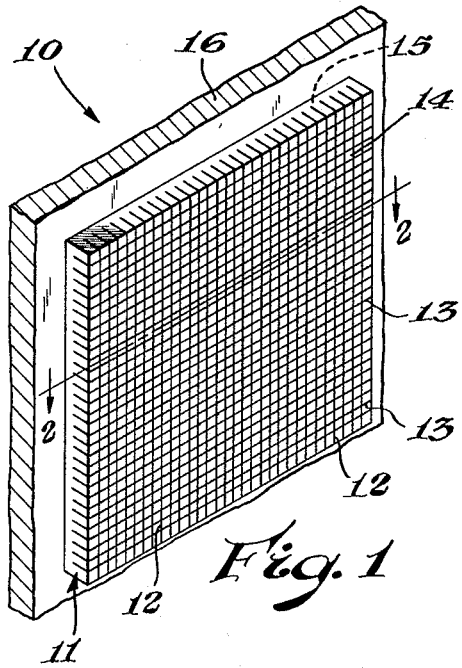
FIGURE 1 is a schematic isometric representation of a sound absorbing member in accordance with the invention.

FIGURE 1 is an isometric representation of a sound absorbing member or structural sheet generally indicated by the reference number 10. The sheet 10 comprises a foam plastic sheet 11 having a plurality of vertical slits 12 and horizontal slits 13 extending from the front face 14 toward the rear face 15. The foam sheet 11 is affixed to a backing member or support as shown at 16.

Figure 2:
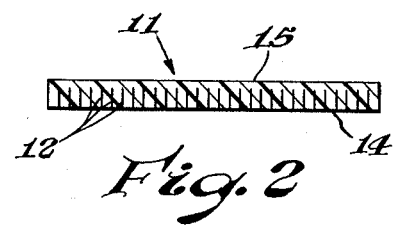
FIGURE 2 represents a cross-sectional view along the line 2—2 of a portion of the board represented in FIGURE 1.

FIGURE 2 illustrates a cross-sectional view of a portion of the sound absorbing member 10 without the backing member 16 showing the slits 12 extending from the front face 14 toward the rear face 15.

Figure 3:
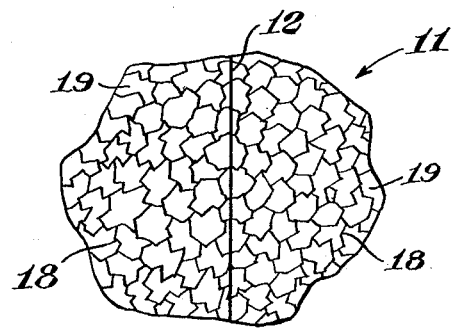
FIGURE 3 represents a greatly enlarged cross-sectional vew of a slit in a sheet in accordance with the invention.

In FIGURE 3 there is illustrated a greatly enlarged view of a portion of the side elevation cross-section of sheet 11 shown in FIGURE 2. In this enlarged view the sheet 11 is shown as comprised of a plurality of cell walls 18 encompassing voids or spaces 19. A slit 12 is formed through the cell walls 18 separating the resulting contiguous cell walls so that they can move with respect to each other although touching.

FIGURES 4, 5, and 6 are schematic representations in plan view of various configurations of slits which may be employed in the practice of the invention, the slits penetrating the face of the foamed plastic material to a substantial depth.

FIGURE 7 shows the absorption of sound when 6 foot by 8 foot foamed plastic sheets slit in accordance with the invention were evaluated for airborne-sound absorption in a standard reverberation chamber by tests in accordance with A.S.T.M. C–423–58T "Tentative Method of Test for Sound Absorption of Acoustical Materials in Reverberation Rooms as Amended 1960."

In the extrusion of foam plastics, the term "skin" referred to in relation to the curves refers to the smooth outer layer that appears on a foam plastic body that is extruded. This represents a relatively continuous homogeneous layer or skin about two to four mils in thickness which is inherently on the surface of an extruded foam plastic article and forms a closure for the cells contiguous to the outer surface. The sheets were prepared by splitting relatively large logs or ingots of foam plastic material into boards having a thickness of two inches so that all sheets had one side having a surface with a skin covering the outer cells of the foamed plastic and an opposite side with cut open cells providing a rough surface, resulting from cleavage or parting of the walls surrounding the voids within the foam plastic sheet. All sheets were prepared from polyethylene foam having a density of about two pounds per cubic foot. Best results are usually obtained when the foamed plastic consists of cells of sizes between about 0.1 to 5 millimeters in diameter although larger cell sized foams may be used.

Curve A represents the noise reduction coefficient at various frequencies up to four thousand cycles per second wherein the sheet sample is positioned with the skin down or against the floor of the chamber and shows a plot of the noise reduction coefficient of a sample of the sheet which is not slit.

Curve B shows the noise reduction characteristics of a sample of the sheet having 1150 cylindrical slits per square foot of sheet face, each slit being about a quarter inch in diameter, perpendicularly penetrating the skin side to a depth of about one and three quarter inches and the slit side exposed to the sound source.

Curve C is the noise reduction coefficient of the sheet sample of curve B inverted with the cylindrical slits facing the floor of the reverberation chamber.

Curve D shows the noise reduction characteristics of a test sheet, skin side up, having 624 cylindrical 3/8 inch diameter slits about 1¾ inches deep per square foot.

Curve E shows the noise reduction characteristics of a sheet treated in accordance with the invention having 480 cylindrical 3/8 inch diameter slits about 1¾ inches deep per square foot with the slit surface facing up and the skin surface down.

Curve F shows the noise reduction coefficients of a sheet having slits patterned in a square arrangement as illustrated in FIGURE 1, the splits spaced 1 inch from each other, and about 1¾ inches deep skin down.

FIGURE 8 shows a plot of the coefficient of absorption of a 2 inch thickness of foamed polyethylene having a density of about 2 pounds per cubic foot, wherein the surface had been slit to a pattern comprising a plurality of dual concentric cylinders about 1¾ inches deep, the larger cylindrical cuts being about 9/16 of an inch in diameter and the smaller ones about 7/16 of an inch in diameter. The absorption coefficient of this pattern is designated as curve G.

For comparison, curve H shows the absorption coefficient of the sample employed to determine curve G after the material lying between the 7/16 inch diameter cylindrical slits and the adjacent 9/16 inch diameter cylindrical slit was removed. The removal of this annular portion left a pattern having a plurality of foam plastic cylinders standing on the base and separated from the main body by a distance of 1/16 of an inch; curve J represents the absorption coefficient of the sample of unslit foam employed in preparation of the sample used to determine curve G.

Curve K of FIGURE 9 shows the coefficient of absorption plotted versus frequency in cycles per second for a 2 inch thick sample of polystyrene foam having a density of about 2 pounds per cubic foot, having cut therein 9/32 inch by 1¾ inch cylindrical slits arranged in a close packed hexagonal pattern. The data points for this curve were obtained with the slit surface facing the sound source. For purposes of comparison, curve L shows the absorption coefficient of an unslit sample of polystyrene foam having similar dimensions and density to the sample used in the determination of curve K.

The curve of FIGURES 8 and 9 were determined by employing the equipment and method substantially similar to that described in "Tentative Method of Testing for Impedance and Absorption of Acoustical Materials by the Tube Method," A.S.T.M. Standards, part 4, supplement 1956, pages 159–171.

Sheets or boards in accordance with the invention may readily be formed by slitting a foamed plastic board or sheet with a sharp knife or similar instrument. The particular design of blade employed for optimum performance will depend upon the particular foamed plastic sheet used in the practice of the invention.

For example, a foamed polystyrene sheet is readily slit with knives having a blade width of about ½ inch and thickness of about 0.015 inch with a sharp cutting edge substantially similar to a conventional safety razor blade. Longitudinal cuts or slits may be placed in the sheet by simply drawing the blade across the sheet in the desired location of the slit with the tip of the blade inserted to the depth desired for the slit.

The slitting operation may be made somewhat easier, particularly when softer expanded plastics are employed, such as expanded polyethylene, when the surface to be slit is placed under tension while the opposite surface is placed under compression, that is, the board flexed or bent so that the convex side is the side to be slit. Various slit patterns may be formed in the sheet, such as those shown in FIGURE 1 and FIGURE 6 by various arrangements of linear cuts.

A rotary or circular knife, broadly similar to a conventional cookie cutter, may be utilized, again depending on the characteristics of the particular foamed plastic being prepared. In cases where plastic foams may be extruded as boards or sheets, a skin or smooth surface usually appears toward the outside. The curves in FIGURE 7, and particularly curves B and C and curves E and F, illustrate the selectivity which may be gained by cutting from the skin side or the severed cell side, thus by selecting the appropriate dimensions for the columns of plastic foam formed by slitting, the sound absorption characteristics of a sheet are varied over a relatively wide range. Care must be exercised in forming the slits in order that the intended slit does not become a groove. The undesirability of a groove is readily appreciated from the data set forth in FIGURE 8. The curve G shows the absorption characteristics of two concentric cylinders and the curve H shows the almost total loss of the desirable low frequency absorption characteristics when the material lying between the two concentric slits is removed. In other words, the contiguous surfaces which abut each other on each side of a slit are to be in contact so as to provide for one surface to rub against the other when one portion moves relative to the other as when subjected to the action of sound waves.

Sheets and walls in accordance with the invention are readily and advantageously employed in a wide variety of applications requiring the absorption of airborne-sound, such as in residential, commercial, and industrial buildings, pump pits, automotive, marine, air craft, and similar applications, wherein both thermal insulation and sound absorbing properties are required.

As is apparent from the foregoing specification, the apparatus of the present invention is susceptible of being embodied in various forms and modifications which may differ particularly from those that have been described in the preceding specification and description without departing from the invention. For this reason it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An airborne-sound absorbing means comprising: a closed cell foamed plastic sheet having a plurality of slits penetrating one face thereof, said slits providing pairs of internal contiguous surfaces touching each other.

2. The airborne-sound absorbing means of claim 1, wherein said slits are disposed in crisscross arrangement.

3. The airborne-sound absorbing means of claim 1, wherein said slits are cylindrical.

4. The airborne-sound absorbing means of claim 1, wherein the plastic sheet has affixed to it a backing means.

5. The airborne-sound absorbing means of claim 4, wherein said slits are disposed in a crisscross arrangement.

6. The airborne-sound absorbing means of claim 4, wherein said slits are cylindrical.

7. The airborne-sound absorbing means of claim 4, wherein said foamed plastic sheet is comprised of polyethylene.

8. The airborne-sound absorbing means of claim 4, wherein said foamed plastic sheet is comprised of polystyrene.

References Cited in the file of this patent

UNITED STATES PATENTS

| | | |
|---|---|---|
| 2,069,413 | Leadbetter | Feb. 2, 1937 |
| 2,285,924 | Halfvarson | June 9, 1942 |
| 2,337,525 | Peik | Dec. 21, 1943 |
| 2,413,568 | Hurley | Dec. 31, 1946 |
| 2,671,522 | Bourgeois | Mar. 9, 1954 |
| 2,855,039 | Gross | Oct. 7, 1958 |
| 2,959,242 | Muller et al. | Nov. 8, 1960 |

FOREIGN PATENTS

| | | |
|---|---|---|
| 127,515 | Sweden | Feb. 28, 1950 |